Feb. 28, 1950     C. R. GOTTSCHALL     2,498,992
BRAKE RESETTING AND TIME DELAY MECHANISM
Filed Sept. 13, 1945     7 Sheets-Sheet 1

INVENTOR.
CLARENCE R. GOTTSCHALL
BY
HIS ATTORNEY

Feb. 28, 1950     C. R. GOTTSCHALL     2,498,992
BRAKE RESETTING AND TIME DELAY MECHANISM
Filed Sept. 13, 1945     7 Sheets-Sheet 2

INVENTOR.
CLARENCE R. GOTTSCHALL
BY John H. Robertson
HIS ATTORNEY

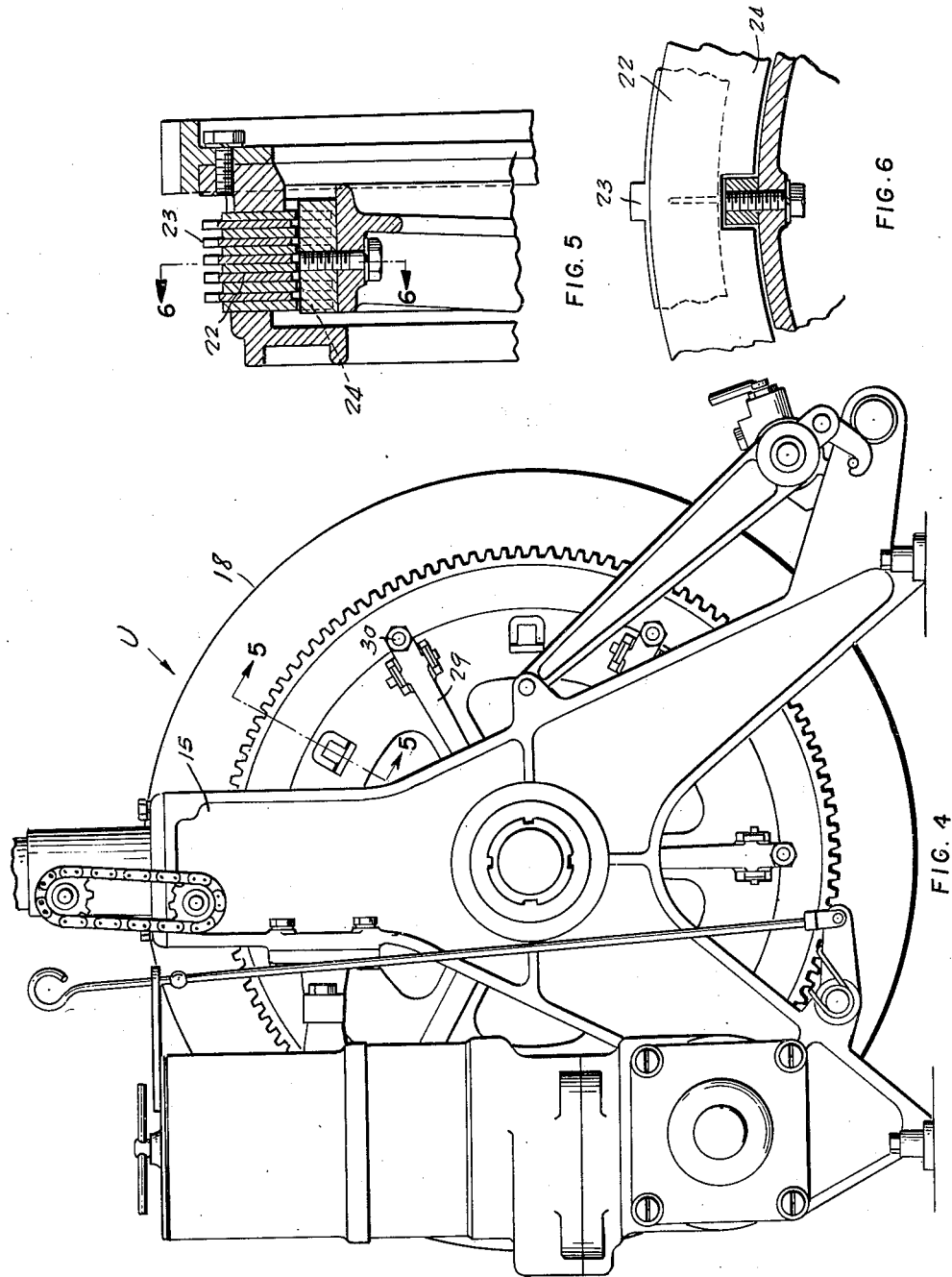

Feb. 28, 1950 C. R. GOTTSCHALL 2,498,992
BRAKE RESETTING AND TIME DELAY MECHANISM
Filed Sept. 13, 1945 7 Sheets-Sheet 4

INVENTOR.
CLARENCE R. GOTTSCHALL
BY John A. Robertson
HIS ATTORNEY

INVENTOR.
CLARENCE R. GOTTSCHALL
BY John A. Robertson
HIS ATTORNEY

Feb. 28, 1950  C. R. GOTTSCHALL  2,498,992
BRAKE RESETTING AND TIME DELAY MECHANISM
Filed Sept. 13, 1945  7 Sheets-Sheet 6

INVENTOR.
CLARENCE R. GOTTSCHALL
BY
HIS ATTORNEY

INVENTOR.
CLARENCE R. GOTTSCHALL
BY John H. Roberts
HIS ATTORNEY

Patented Feb. 28, 1950

2,498,992

UNITED STATES PATENT OFFICE 2,498,992

BRAKE RESETTING AND TIME DELAY MECHANISM

Clarence R. Gottschall, Wilmington, Del., assignor to All American Airways, Inc., a corporation of Delaware Application September 13, 1945, Serial No. 615,932

11 Claims. (Cl. 254—173)

This invention relates to mechanism employed in controlling the unwinding of a cable from a drum and is concerned primarily with mechanism which is now commonly known as brake resetting and time delay mechanism.

At the present time there has come into widespread use apparatus which is known as a pickup unit. This unit is installed in aircraft for the purpose of effecting pick-up operations. Essential elements of such a unit are a cable and a drum on which the cable is wound together with braking instrumentalities and mechanism for controlling the application of the brakes. Such a unit may be employed not only for air pick-up purposes but also in certain arresting operations and perhaps other places where the unwinding of a cable from a drum is accurately controlled by the application of brakes, particularly as to the time of application. Thus, while the invention will hereinafter be described in relation to air pick-up it is to be clearly understood that the invention is not to be limited to this particular usage as it is susceptible of adoption wherever units of this type are employed to control the paying out of a cable.

An air pick-up is ordinarily made with the aircraft traveling at a high rate of speed. The object to be picked up, whatever it may be, is ordinarily immovable on the ground and connected to the loop of the ground station. Thus, when contact is first effected the drum of the pick-up unit is immovable and its moment of inertia must be quickly overcome and the drum accelerated to high speed rotation. This means that for the period immediately subsequent to contact with the ground station there should be no application of the brakes to the drum. That is, the drum should be left to rotate freely so that it may be quickly accelerated. After its moment of inertia has been overcome and the proper acceleration attained, the brakes are applied to more or less gradually reduce the speed of rotation so as to gradually accelerate the object being picked up to the speed of the aircraft. The present invention is concerned primarily with the mechanism employed for controlling the application of the brakes and which allows for this period of free rotation immediately after contact.

While brake resetting and time delay mechanisms of this type have been provided for this purpose they have not been satisfactory from certain aspects and as a general rule have consisted of complicated and cumbersome devices which more or less clutter up the unit. Accordingly, the invention has in view as its foremost objective the provision of a new and improved brake resetting and time delay mechanism which is substantially completely enclosed and carried by the shaft on which the drum is mounted. With such an arrangement the unit is kept free from outward and cumbersome attachments and affords a generally simplified appearance. Moreover, the brake resetting and time delay mechanism is adequately protected and the likelihood of damage thereto kept at a minimum.

An air pick-up unit of the type to which this invention is intended to be applied ordinarily includes a shaft on which the cable carrying drum is rotatably mounted. Braking instrumentalities usually in the form of a disc stack are associated with the drum and supporting structure and are rendered effective by a spring that is enclosed within the tubular shaft. This spring is tensioned by what is known as the resetting operation and when the spring is released the brakes are applied. A further object of the invention is the provision of brake resetting and time delay mechanism which is particularly adapted to control the release of the brake applying spring aforesaid.

Still more in detail the invention has in view as an object the provision of mechanism of the type above noted which is susceptible of quick and easy manipulation to carry out the resetting operation.

Still another object is the provision of mechanism of this type which may be readily adjusted to vary the time interval allowed for the free rotation of the drum. That is, the mechanism may be adjusted to vary the relative moment when the brakes are applied as compared to initiation of rotation of the drum.

Various other more detailed objects and advantages of the invention will in part become apparent and in part be hereinafter stated as a description of the invention proceeds.

The invention, therefore, comprises novel brake resetting and time delay mechanism adapted to be mounted on and substantially completely enclosed by the shaft on which a cable carrying drum is rotatably mounted.

For a full and more complete understanding of the invention reference may be had to the following description and accompanying drawings wherein:

Fig. 4 is a view in end elevation of the unit to which the brake resetting and time delay mechanism of this invention has been applied.

Fig. 5 is an enlarged detail showing mostly in section developing details of the disc stack. This view is taken about on the plane represented by the line 5—5 of Fig. 4.

Fig. 6 is another detail showing taken normal to the showing of Fig. 5. This view is taken about on the plane represented by the line 6—6 of Fig. 5.

Figure 1:
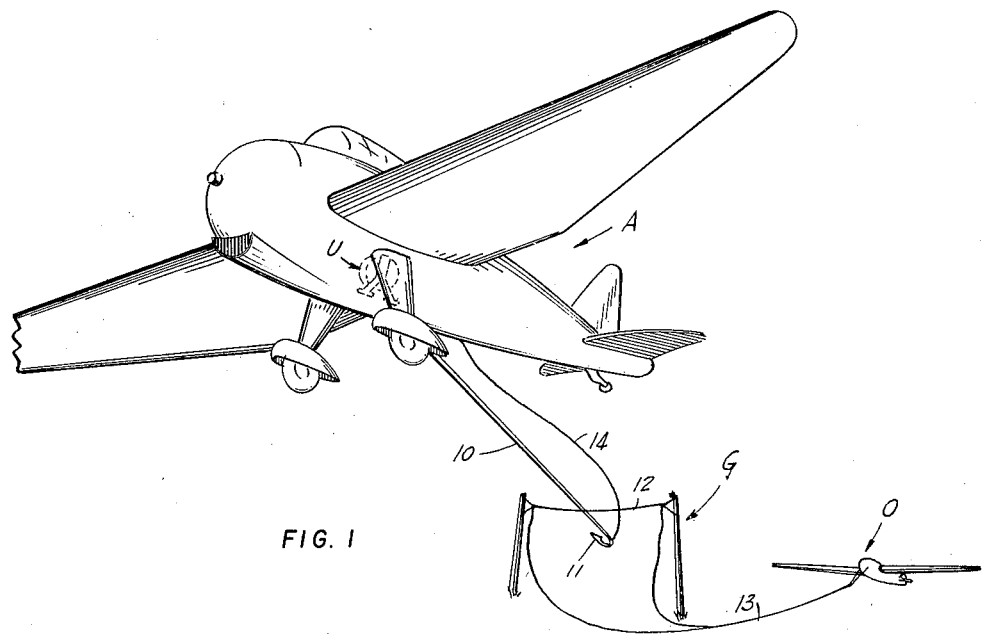
Fig. 1 is a perspective depicting an aircraft about to effect a pick-up.
Figure 2:
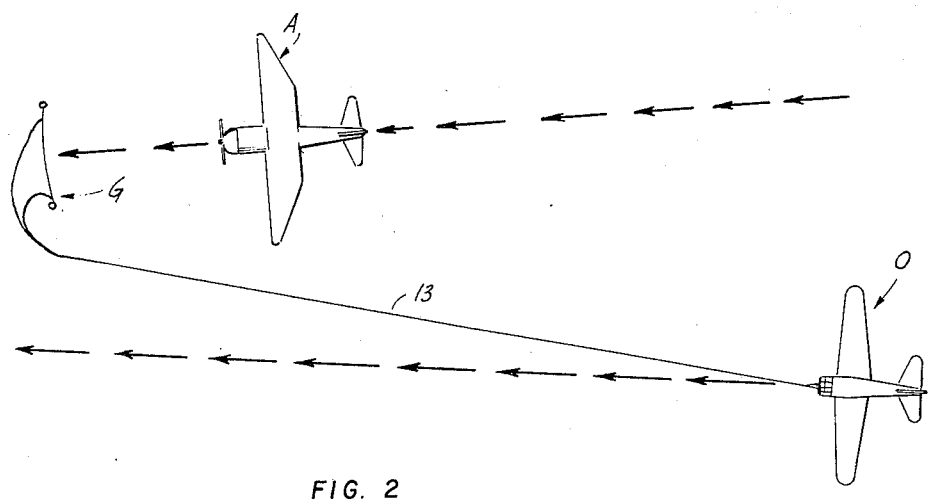
Fig. 2 is a top plan view somewhat diagrammatic showing the relation of the pick-up aircraft, ground station, and glider to be picked up.

Referring now to the drawings wherein like reference characters denote corresponding parts and first more particularly to Figs. 1 and 2, an aircraft is therein illustrated and referred to generally by the reference character A. The aircraft A carries a contact arm 10 which in turn detachably carries a hook 11 that is adapted to engage a loop 12 of a ground station which is referred to in its entirety by the reference character G. The object which is to be picked up, which in the instance of the illustrated embodiment is a glider, is designated 0. It is connected with the loop 12 by a leader line 13. A cable 14 has one end connected to the hook 11 and its other end is taken up on the drum of a pick-up unit which is mounted within the aircraft A. This pick-up unit is referred to in its entirety by the reference character U, such unit being more completely illustrated in Figs. 3 and 4.

From the foregoing it is apparent that the invention is presently being described as applied to the pick-up unit of an aircraft. However, it is to be distinctly understood that the invention is susceptible of use wherever it is necessary to accurately control the application of brakes to a cable carrying drum for the purpose of decelerating the rate at which the cable is paid out.

Figure 3:
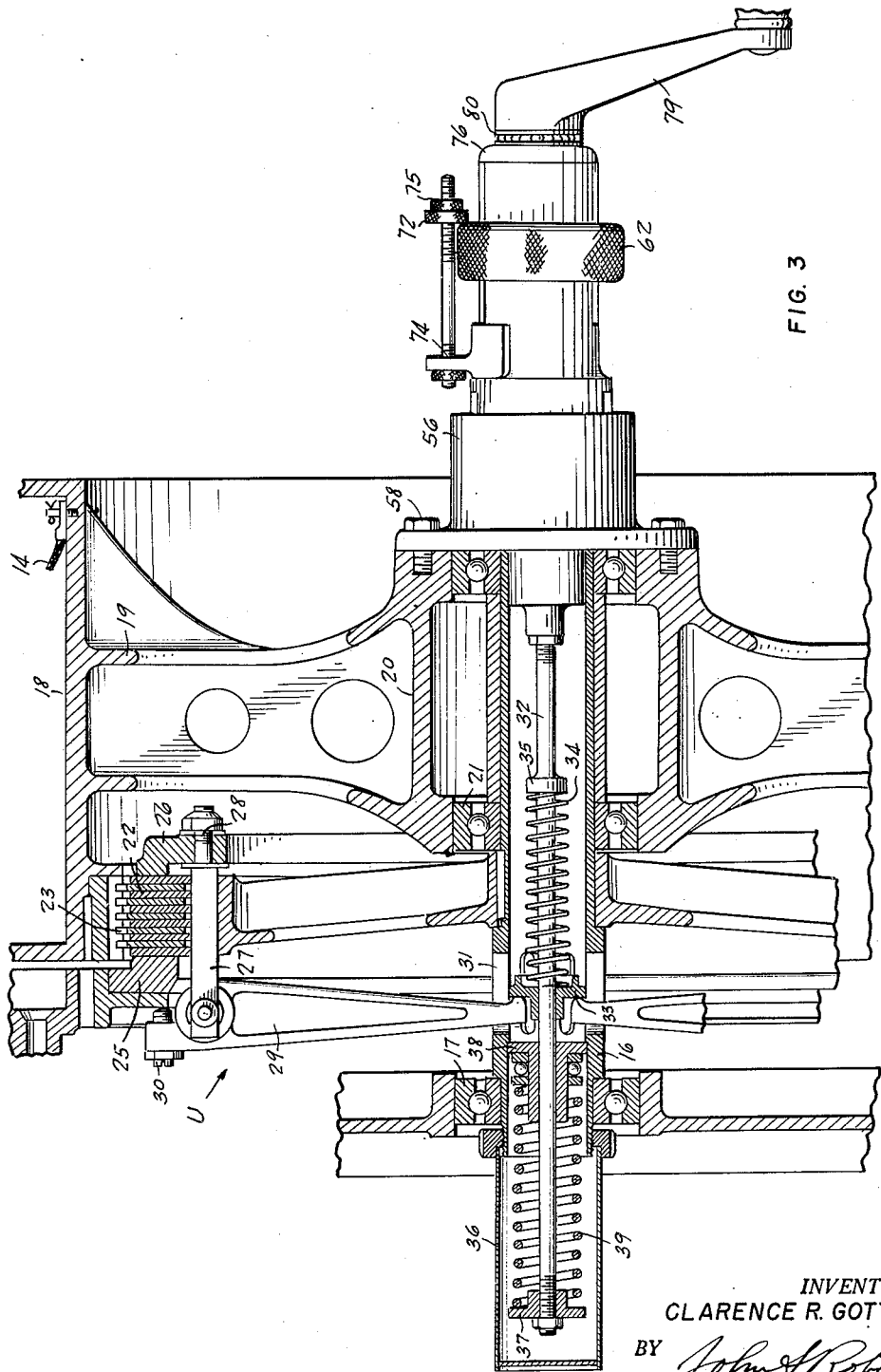
Fig. 3 is a sectional view taken on an enlarged scale through a portion of the cable carrying drum and particularly through the shaft thereof.

Referring now more particularly to Figs. 3 and 4, the unit U is shown as comprising supporting framework, including a standard 15 such as shown in Fig. 4. Carried by the supporting framework is a tubular shaft 16 which is journaled for rotation in the supporting framework by appropriate bearing assemblies, one of such bearing assemblies being shown at 17 in Fig. 3.

A drum 18 which carries the cable 14 includes a central supporting web structure 19 which connects and supports the outer cylindrical part of the drum from a central hub portion 20. The hub 20 is mounted for rotation about the shaft 16, bearing assemblies 21 being provided for this purpose.

Braking instrumentalities for controlling rotation of the drum 18 are shown in the form of a disc stack 22. As is more clearly shown in Figs. 5 and 6 alternate elements of the stack 22 are provided with outer keys 23 which are received in keyways in the drum, thus these elements may move in the direction of the axis of the drum but are non-rotatable with respect thereto. The other alternate elements of the stack 22 are provided with inner keys 24 which are received in keyways in the stationary supporting structure. It is evident that when no pressure is applied on the stack 22 the drum 18 is permitted to rotate freely. However, when pressure is applied to the stack braking effects are accomplished to decelerate rotation of the drum 18. The stack 22 is enclosed between a backing plate 25 at the outer end and a movable pressure plate 26 on the inner side.

A plurality of actuating links 27 (in the form of the invention illustrated three of these links are employed although only one is shown in Fig. 3) have their inner ends anchored to the pressure plate 26 as indicated at 28 and the outer end of each link is secured to a lever 29. There is a lever 29 corresponding to each link 27. The outer end of each lever 29 carries an adjustable pivot pin 30 and the free end of this pin bears against the supporting framework to act as the fulcrum of the lever. The inner end of each lever 29 extends through a slot 31 in shaft 16. A brake applying rod 32 is operatively mounted within the tubular shaft 16. Surrounding the rod 32 and slidably mounted within the shaft 16 is a ring-like abutment member 33 which engages the inner ends of the levers 29 and is held in such engagement by an expansion spring 34 which engages the abutment member 33 at one end and a spring retainer 35 at the other end, the latter being formed on the shaft 32.

The tubular shaft 16 is continued through the bearing assembly 17 and the outer end which normally would be open is covered by a closure in the form of a tubular cap 36. The rod 32 is continued out into the cap 36 and on its free end carries a spring retainer 37. A second spring retainer 38 slidably encompasses the rod 32 and is anchored within the shaft 16. An expansive brake applying spring 39 surrounds the rod 32 and has its ends engaging the retainers 37 and 38. It is evident that if the rod 32 is released the spring 39 will tend to move the rod to the left, speaking with reference to the showing of Fig. 3, and when so moved the spring retainer 35 compresses the spring 34 and the latter through the abutment 33 moves the inner ends of the levers 29 to the left, thus, exerting a pull on the links 27 to urge the pressure plate 26 against the disc stack 22 and thus apply the brakes.

The mechanism for controlling release of the rod 32 will now be described. Speaking with reference to the showing of Figs. 3, 7, 8 and 9, the shaft 16 is continued past the outermost bearing assembly 21 in the form of a shaft extension 40 which is formed with slots 41 immediately adjacent to the outermost bearing assembly 21 and a second set of slots 42 that are spaced from and aligned with the slots 41. It is notable that the rod 32 is continued out through this shaft extension 40. The outer free end of the rod is threaded as indicated at 43 and a portion of the rod 32 within the hub 20 is also threaded as indicated at 44.

A latchbox 45 includes a sleeve 46 which is screwed onto the threads 44 and positively held in an adjusted position by a lock nut 47. The latchbox 45 is of a cylindrical formation and is slidable within the bore of the shaft 16. The outer end of the latchbox 45 carries an inwardly extending ring-like flange 48 which is adapted for engagement with the hooked ends 49 of latch fingers 50. The latter are pivotly mounted as indicated at 51 on a latch support 52 that is carried by the shaft extension 40 and may be secured to the said extension by a bolt or rivet 40a. This latch support 52 includes a central opening 53 through which the rod 32 slidably passes. Each of the latch fingers 50 is adapted for engagement by a collapsible nut element to be later described and thus swing the latches on the pivots 51 to release the hooked ends 49 from the flange 48. The collapsible nut will override the latches in the manner depicted in the drawings. A leaf spring element 55 normally maintains the hooked ends 49 of the latches 50 in their outermost position engaging the flange 48.

An internally threaded nut 56 is disposed about the shaft extension 40 opposite to the slots 41 and is connected by an end flange 57 and screws 58 to the hub 20. Because of this connection the internally threaded nut 56 rotates with the drum 18.

A carrier member 59 comprises a circular sleeve through which the rod 32 slidably passes and outwardly extending webs 60 which pass through the slots 42. The outer edges of the web 60 are threaded as indicated at 61. With the outer edges of the web 60 considered as one cylindrical surface a reset nut 62 is screwed onto these threads 61 and has an outer abutment surface 63 and inner abutment faces 64 and 65. A collapsible nut follower comprising complemental parts is carried by the carrier 59. Each of the elements of this collapsible nut follower is a duplicate of the other element and therefore only one of them is here described for the purposes of this specification. The collapsible nut follower is made up of complemental elements 66. Each of the elements 66 is pivotly mounted as shown at 67 on one of the webs 60. At this end the element 66 carries a pair of outwardly extending ring-like flanges 68 and 69, the flanges being arranged on opposite sides of the pivot 67. These flanges extend through the slots 42.

The elements 66 extend through the bore of this extension shaft 40 to the slots 41 where each is provided with a gooseneck construction 70 which extends through the respective slots 41. Each element 66 terminates in a segment of a cylindrical surface which is externally threaded as shown at 71. The threads 71 are complemental to and adapted for engagement with the inner threads on the nut 56. It is evident that when the reset nut 62 is screwed to the right, speaking with reference to the showing of Figs. 7, 8, and 9, the inner abutment surface 65 engages the flanges 69 to swing the elements 66 on their pivot 67 and move the threads 71 outwardly into engagement with the threads of the nut 56. On the other hand, when the reset nut 62 is screwed to the left the inner abutment face 64 engages the flanges 68 to swing the elements 66 on their pivot 67 inwardly and disengage the threads 71 from the threads of the nut 56.

It is evident that the carrier 59, reset nut, and collapsible nut follower consisting of the elements 66 may be moved as an entirety when the threads 71 are out of engagement with the threads of nut 56 within certain limits as defined by one end of the slots 42 and an adjustable stop shown at 72. The latter comprises a nut element which is threaded on a screw rod 73 which is anchored at its inner end to certain structure carried by the shaft extension 40 as indicated at 74. The nut 72 is positively held in an adjusted position by a lock nut 75.

Fitted in the outer end of the shaft extension 40 is a cap member 76 having a central opening 77 which is spaced from the threads 43 on the shaft 32 a sufficient distance to provide for the insertion of the threaded sleeve 78 of a reset crank 79. If desired, a bearing assembly 80 may be interposed between the hub of the reset crank and the end of the cap 76.

*Operation*

While the mode of operation of the above described mechanism is believed to be self-evident, it may be described by noting that the nut 72 is first adjusted to the proper position for determining a particular time interval desired. This interval is the lapse of time between the initiation of rotation of the drum 18 and the moment of application of the brakes. That is, the time interval is the period during which the drum will rotate freely without being under the influence of any braking effects.

Figure 7:
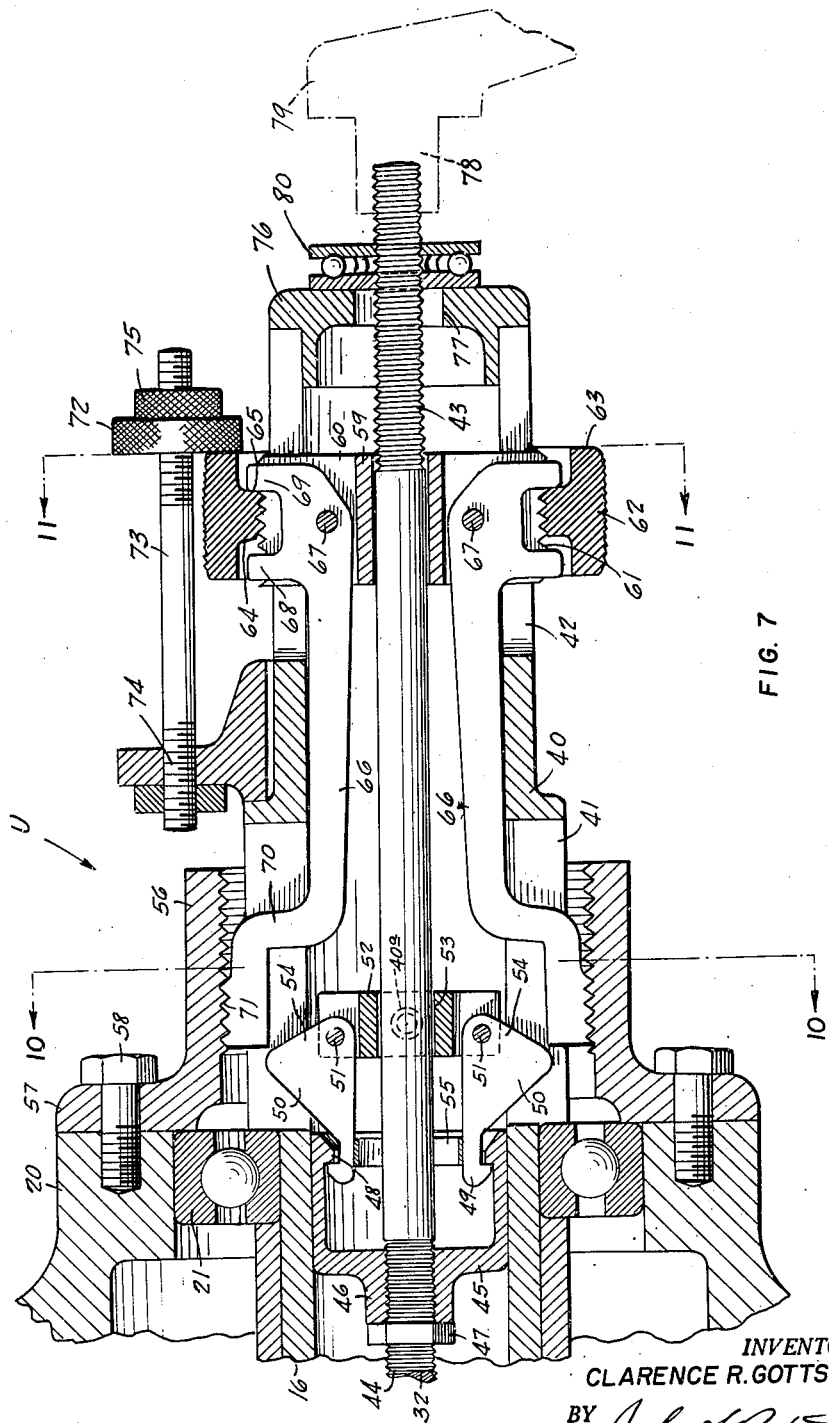
Fig. 7 is a sectional view on an enlarged scale taken through the end of the shaft housing the brake resetting and time delay mechanism and developing one position of such mechanism.
Figure 8:
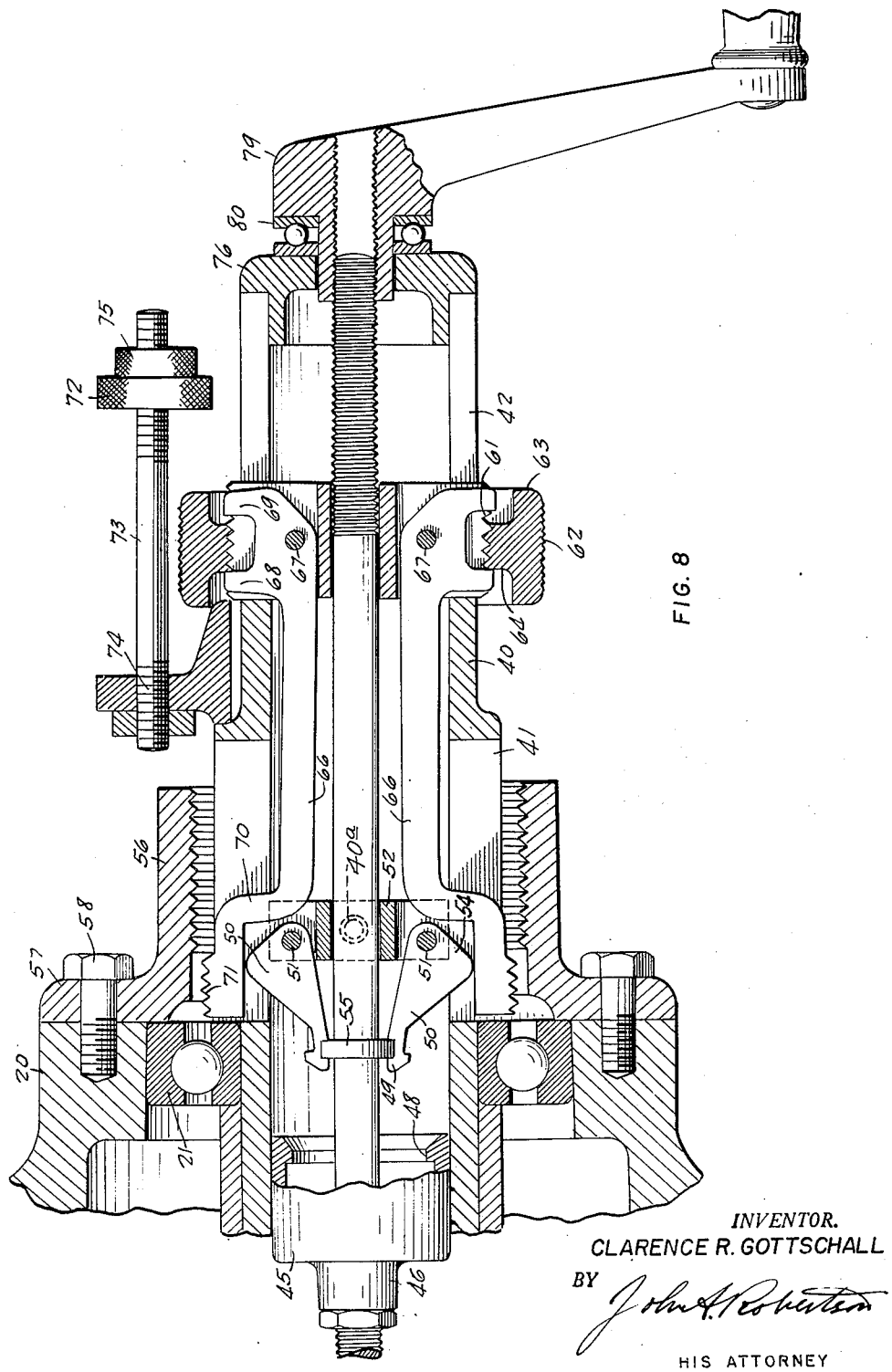
Fig. 8 is a sectional view similar to the Fig. 7 bringing out another position of the mechanism.
Figure 9:
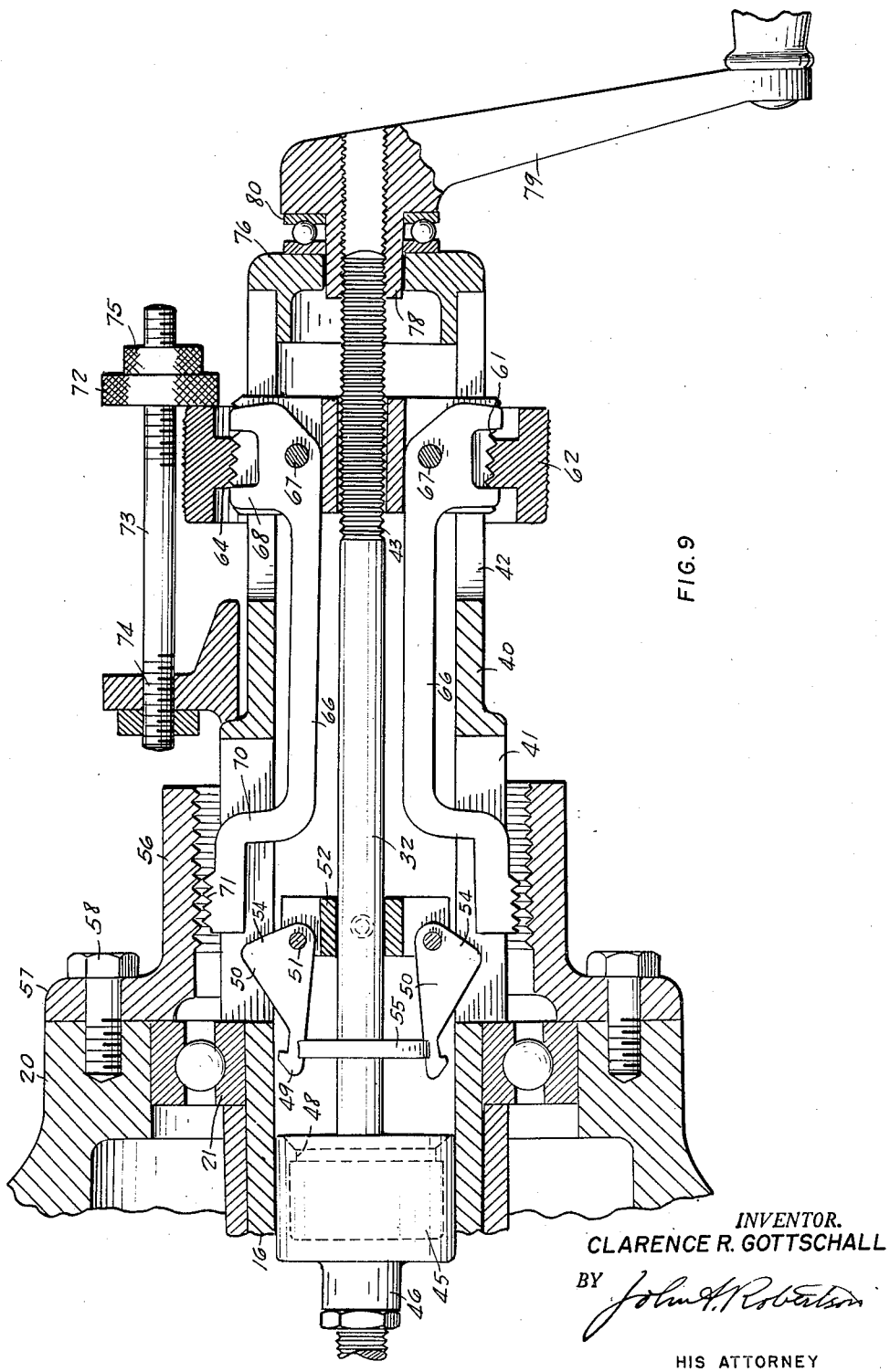
Fig. 9 is another view similar to Fig. 7 bringing out still another position of the mechanism.
Figure 11:
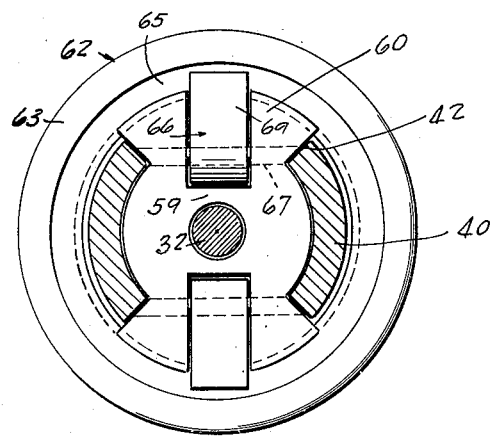
Fig. 11 is another sectional view taken about on the plane represented by the line 11—11 of Fig. 7.
Figure 10:
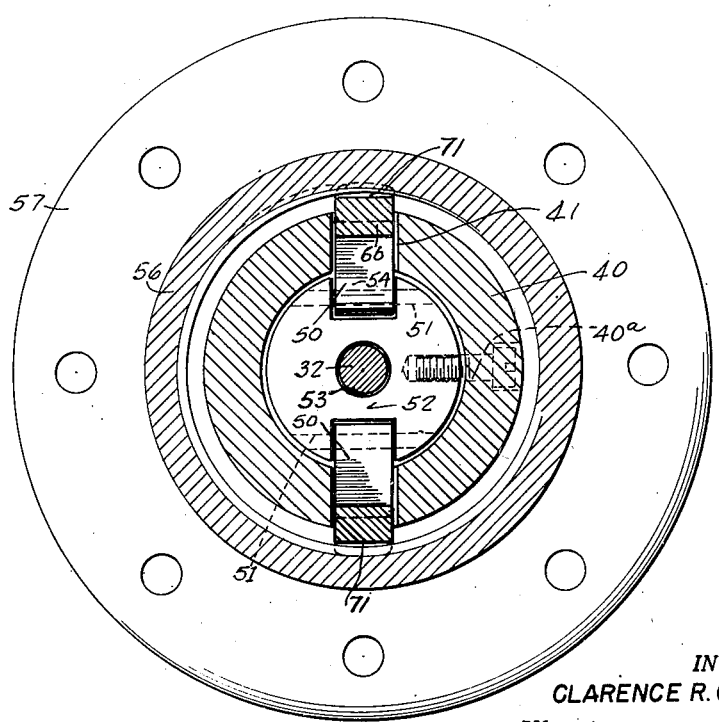
Fig. 10 is a detailed sectional view taken about on the plane represented by the line 10—10 of Fig. 7.

The reset nut 62 will first be screwed so as to move it inwardly and cause the face 64 thereof to engage the flanges 68. This depresses or collapses the elements 66 and moves the threads 71 out of engagement with the inner threads of the nut 56. The entire assembly comprising carrier 59, reset nut 62, and elements 66 is then moved outwardly until the abutment surface 63 on the reset nut 62 engages the stop 72. The reset nut 62 is then turned in a reverse direction to cause the abutment face 65 to engage the flanges 69, as shown in Fig. 7, and move the threads outwardly into meshing engagement with the inner threads of the nut 56. The reset crank 79 is now rotated to move the brake applying rod 32 outwardly. This movement is continued until the inwardly extending flange 48 on the latch-box 45 passes the hooked ends of the latch fingers 49 so that the latter catch thereon. The latch fingers will now hold the shaft 32 against inward movement. The reset crank is then partially unscrewed from the threads 43 so as to move it to the right a sufficient distance to allow for inward movement of the rod 32 which will occur when the brakes are applied, as shown in the dotted line position of Fig. 7.

When contact with the ground station is effected, the cable 14 starts the drum 18 into rotation. During this initial period of rotation the rod 32 is held in position in which no pressure is applied on the stack 22 and the rotation of the drum is free. However, as the drum rotates the internally threaded nut 56 is also rotated and due to the engagement of the threads 71 therewith the elements 66 of the collapsible nut follower are moved inwardly until such time as the inner ends of the threaded portions 71 of nut sections 66 strike against the end abutment 54 on the latches 50. This engagement depresses the hooked ends 49 of the latches against the influence of the spring 55 and causes the hooked ends to clear the flange 48 whereupon the latch-box 45 is released and the rod 32 correspondingly released to apply the brakes in the manner already described. This completes the cycle of operation. The device may be reset by repeating the operation as above described.

While a preferred specific embodiment of the invention is hereinbefore set forth, it is to be clearly understood that the invention is not to be limited to the exact construction illustrated and described because various modifications of

What is claimed is:

1. In a cable control unit a drum, a cable on the drum, a tubular shaft on which said drum is journalled, including a spring actuated brake applying rod enclosed within said tubular shaft, time delay mechanism comprising a latch operative mounted within said tubular shaft, a detent on said rod adapted for engagement by said latch, an assembly consisting of a collapsible nut, a carrier therefor, and a reset nut follower slidably mounted in said shaft, an internally threaded sleeve carried by said drum with the threads thereof engaging said collapsible nut, said reset nut follower being operable to engage or disengage the threads on said collapsible nut with respect to the internal threads on said sleeve, the inner ends of said nut being adapted to engage said latch to release the same, and means for moving said rod outwardly to engage said latch with said detent and set the mechanism with respect to said reset nut.

2. In a cable control unit a drum, a cable on the drum, a tubular shaft on which said drum is journalled, including a spring actuated brake applying rod enclosed within said tubular shaft, time delay mechanism comprising an internally threaded sleeve operatively connected with said drum, a collapsible nut meshing with said threads, abutment means on said nut, and cooperating latch and detent means on said tubular shaft and rod respectively adapted to be engaged by said abutment means to break the latching relation.

3. In a cable control unit a drum, a cable on the drum, a tubular shaft on which said drum is journalled, including a spring actuated brake applying rod enclosed within said tubular shaft, time delay mechanism comprising an internally threaded sleeve carried by the said drum, a collapsible nut having threads meshing with said internal threads and an abutment, a latch pivotally mounted on said tubular shaft a detent on said rod cooperating with said latch, spring means for maintaining said latch in engagement with said detent, said abutment being adapted to engage said latch to disengage it from the detent against the influence of said spring means, means for engaging and disengaging said collapsible nut from said threads, and a reset crank operatively associated with said rod.

4. In time delay and brake resetting mechanism of the character described a collapsible nut assembly comprising a carrier having a plurality of radially extending webs that are externally threaded, an element of a collapsible nut pivotally mounted on each web, each of said elements having a flange on opposite sides of its pivotal mounting, and a nut follower threaded onto the externally threaded surface of said webs and having faces adapted for operative engagement with said flanges.

5. In brake resetting and time delay mechanism of the character described a collapsible nut assembly comprising a carrier for said nut, said carrier member being formed with a tubular hub through which a brake actuating rod is adapted to pass, a plurality of radial webs carried by said hub, an element of a collapsible nut pivotally mounted on each of said webs, and means on said carrier for swinging said elements on their pivotal mountings.

6. In brake resetting and time delay mechanism a collapsible nut assembly comprising a carrier having a tubular hub adapted to receive a brake actuating rod and a plurality of radial webs, the outer edges of which are threaded, complemental elements of a collapsible nut, each element being pivotally mounted on one of said webs, each of said elements including a sector of a cylinder that is externally threaded and an abutment to engage a latch, flanges on each of said elements on opposite sides to its pivotal mounting, and a nut follower having opposite faces adapted for operative engagement with said flanges.

7. In brake resetting and time delay mechanism of the character described, latching mechanism for holding a brake actuating rod in set position within a hollow tubular shaft comprising a latchbox on said rod, an inwardly extending flange on said latchbox, a latch pivotally mounted in said tubular shaft and having a hooked end adapted to engage said inwardly extending flange, spring means for holding said hooked end in engagement with said flange and an abutment surface on said latch, and second movable abutment means adapted to retract said hooked end from said inwardly extending flange against the influence of said spring.

8. In brake resetting and time delaying mechanism including a brake actuating rod mounted within a tubular shaft, latching mechanism for said rod comprising a cylindrical latchbox slidable in said shaft and anchored to said rod, an inwardly extending ring-like flange on said latchbox, a plurality of latches pivotally mounted within said tubular shaft, each of said latches having a hooked end adapted for engagement with said flange, a spring maintaining said engagement, an abutment surface on each latch and second movable abutment means adapted to engage said first abutment surfaces to disengage the hooked end of each latch from said flange.

9. In combination with a cable control unit including a brake actuating rod operatively mounted within a tubular shaft, a collapsible nut assembly comprising a collapsible nut, a carrier therefor and a nut follower, said assembly being movable as a unit within said shaft, stop means for limiting movement of said unit, latch means associated with said shaft and rod and adapted to be affected by said collapsible nut, and means for imparting rectilineal movement to said rod to carry out a setting operation.

10. In a cable control unit including a cable carrying drum, a tubular shaft on which said drum is mounted, a spring actuated brake applying rod within said shaft and braking instrumentalities associated with said drum and adapted to be applied by said rod, time delay and brake resetting mechanism comprising latch means on said shaft and rod respectively, an internally threaded sleeve on said drum, and mechanism operatively associated with said sleeve to be affected by rotation thereof to disengage said latch means.

11. In a cable control unit including a cable carrying drum, a tubular shaft on which said drum is mounted, a spring actuated brake applying rod within said shaft and braking instrumentalities associated with said drum and adapted to be applied by said rod, time delay and brake resetting mechanism comprising a slotted extension of said shaft, an internally threaded sleeve carried by said drum and surrounding a slotted portion of said shaft extension, a collapsible nut within said extension and including portions extending through the slots thereof and meshing with the threads of said internally threaded sleeve, means to engage and disengage said collapsible nut from the threads of said sleeve, said means being movable with said nut as a unit within said shaft, a stop for limiting such movement, latch means associated with said shaft and rod and adapted to be engaged by said collapsible nut to break the latching relation, and a reset crank carried by said shaft extension and in threaded engagement with said rod.

CLARENCE R. GOTTSCHALL.

REFERENCES CITED

The following references are of record in the file of this patent:

UNITED STATES PATENTS

| Number | Name | Date |
| --- | --- | --- |
| 844,469 | Prouty | Feb. 19, 1907 |
| 964,752 | Cartwright | July 19, 1910 |
| 1,070,197 | Snell | Aug. 12, 1913 |
| 2,433,488 | Schultz | Dec. 30, 1947 |
| 2,482,705 | Cotton | Sept. 20, 1949 |